A. F. BURGESS.
MILK-COOLER.
No. 173,158. Patented Feb. 8, 1876.
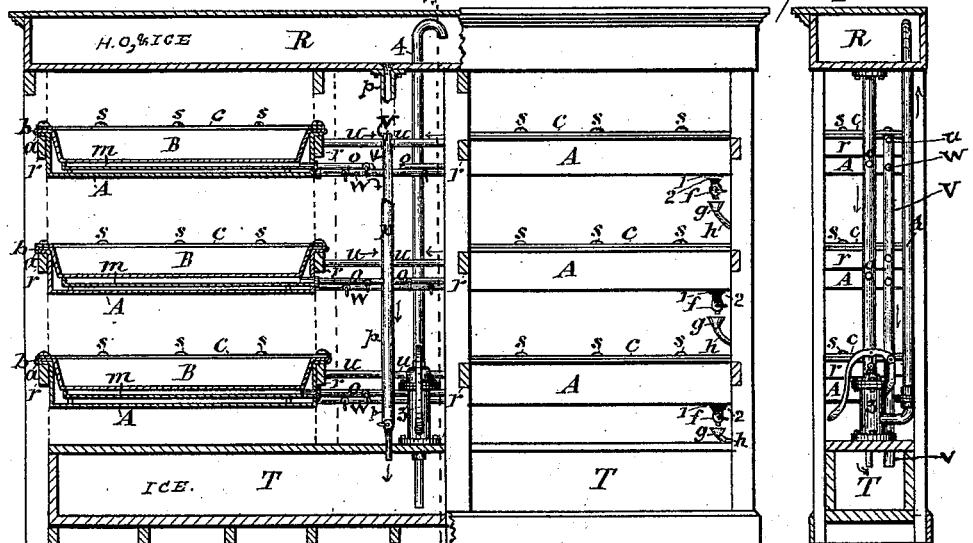
Fig. 1.
Fig. 2.
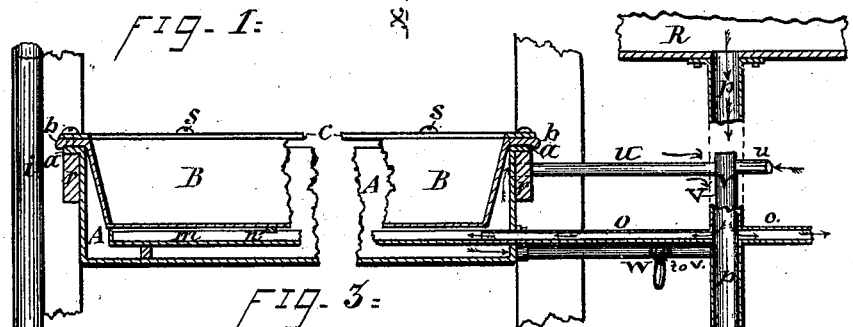
Fig. 3.
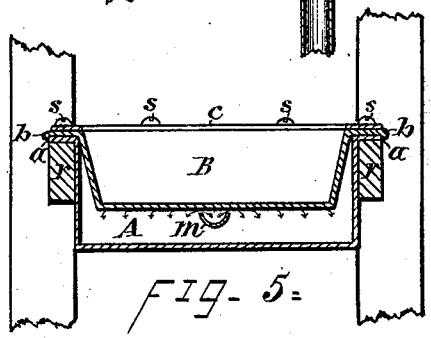
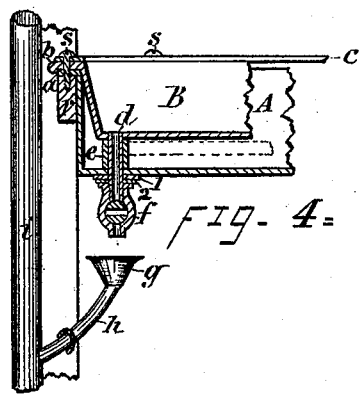
Fig. 4.
Fig. 5.
WITNESSES
Christian Holmstrup Jr.
Chas. H. Hy.
INVENTOR
Albert F. Burgess
per E. Laass Atty.

UNITED STATES PATENT OFFICE.

ALBERT F. BURGESS, OF ERIEVILLE, NEW YORK.

IMPROVEMENT IN MILK-COOLERS.

Specification forming part of Letters Patent No. 173,158, dated February 8, 1876; application filed December 13, 1875.

*To all whom it may concern:*

Be it known that I, ALBERT F. BURGESS, of Erieville, in the county of Madison, in the State of New York, have invented a new and useful Improvement in Milk-Coolers, of which the following, taken in connection with the accompanying drawing, is a full, clear, and exact description.

My invention relates to improvements in that class of milk-coolers having a milk-pan placed within a tank, supplied with a stream of water, and provided with an overflow-pipe for the water and a discharge-pipe for the milk. It consists principally, first, in an improved manner and means of securing the milk-pan to the cooler, to prevent the lifting of the former by water in the latter; second, in the application of a water-supply trough to the cooler and milk-pan, whereby the liability of clogging the supply is avoided, and the water distributed uniformly over the bottom of the pan; third, in the combination, with a milk-rack, having arranged therein one or more coolers, which are supplied with water from a reservoir on top of the rack, and have a vertical main discharge-pipe, of a reservoir at the bottom of the rack, and a pump for conveying the water from the lower to the upper reservoir, all constructed as hereinafter fully described, and for the purposes specified.

In the accompanying drawing, Figure 1 is partly a side view and partly a central longitudinal section of a milk-rack embracing my improvements; Fig. 2, a transverse section of same through line *x x* in Fig. 1. Fig. 3 is an enlarged central longitudinal section of the milk-pan and cooler, showing the construction and application of the water-supply trough and its connection with the main supply-pipe, and also the manner of securing the milk-pan to the cooler. Fig. 4 is a detail view of the arrangement for drawing off and conveying the milk from the pan to the outside, or to a receptacle; and Fig. 5 is a transverse section of the milk pan and cooler, showing the position of the water-supply trough.

Similar letters of reference indicate corresponding parts.

A is the cooler, having a level bottom, perpendicular sides, and an outward flange or ledge, *a*, around its top edge, whereby it is supported on the rail *r* of the rack. B is the milk-pan, constructed in the ordinary way, with a level bottom and flaring sides, with an outward flange or ledge, *b*, around its top, by which ledge the pan is supported on the ledge *a* of the cooler. The depth of the latter exceeds that of the pan, to form a space between their bottoms, which space is extended around the sides of the pan by its flaring sides.

For the purpose of more securely holding the pan and cooler in place, and preventing the former from lifting by water in the latter, and at the same time admit of a ready removal of the pan, the iron band *c* is placed on top of the supporting-ledge *b*, and fastened by screws *s*, passing through the ledges *b* and *a* into the rail *r*.

*d* is a discharge-pipe for milk, which, for the purpose of facilitating the washing of the pan, is attached in one of the corners thereof. It extends downward through the bottom of the cooler, and is provided with the collar *e* between the two bottoms, to keep them a proper distance apart, and relieve them of the strain incident from the tightening of the joint. The pipe *d* is provided with screw-threads at the lower end, onto which is screwed the stop-cock *f*. 1 is a gasket or packing fitted around the pipe under the bottom of the cooler; and 2 is a washer, interposed between the packing and face of the stop-cock *f*, to prevent the latter from twisting the packing out of place, the packing being tightened by the screw in the stop-cock. *g* is a funnel, attached to the end of the pipe *h*, and supported thereby under the cock *f*. The other end of the pipe *h* is connected with a main discharge-pipe, *i*, on the side of the rack, which latter pipe is extended to a receptacle or a trough at the bottom. *m* is the water-supply trough, extended the length of the bottom of the milk-pan, and placed central therewith. It is closed at the ends, and supported thereat on the bottom of the cooler at such a height as to bring the open top of the trough within close proximity of the bottom of the milk-pan. About midway its length it is provided with a shoulder or upward projection, *n*, on top, which prevents the pan, when sagged in the center, from closing the space between the trough and pan. One end of the trough is connected with the supply-pipe o, which is provided with a faucet outside of the cooler, which faucet regulates the ingress of the water.

The water escapes through the opening on top of the trough, as indicated by arrows in Fig. 5 of the drawing, and spreads over the under side of the bottom of the milk-pan, thereby bringing the cold water more intimately in contact with the exterior surface of the pan, and also avoiding the liability of becoming clogged, which perforated pipes are subjected to.

$u$ is an overflow-pipe, intersecting the cooler where it is desired to maintain the height of the water, and extending to a main discharge-pipe, $v$. $w$ is a pipe attached at the bottom of the cooler, and likewise connected with the pipe $v$. It is provided with a stop-cock, and, by closing the cock on the supply-pipe $o$ and opening the former on the pipe $w$, the water is drawn from the cooler, to admit of cleaning or repairing same. The supply-pipe $o$ is connected with a main supply-pipe, $p$, which, in cases where a natural flow of water can be obtained, is extended to receive that flow.

In cases where the water is supplied from a well, the reservoir R is constructed on top of the rack, and the main supply-pipe connected therewith. This reservoir is filled to maintain the supply over night, and, if necessary, ice can be employed to keep the water cold.

Where neither of the aforesaid supplies are convenient, and the water is scarce, the reservoir T is constructed at the bottom of the rack in addition to that at the top. In this case the discharge-pipe $v$ is extended to discharge the water into the lower reservoir, and a pump is placed in a convenient position for conveying the water back to the top reservoir. 3 represents the pump, having the discharge-pipe 4 extended to the top of the reservoir R.

By this arrangement the water is retained and can be used for an indefinite length of time, it being cooled by placing ice in the bottom reservoir. The reservoirs are closed, to prevent the water from being affected by the animal heat which is expelled from the milk.

The lower end of the main supply-pipe $p$ is provided with a stop-cock, which is opened when it is desired to empty the upper reservoir, and the lower reservoir is provided with suitable devices for emptying it.

Either of the shelves in the rack can be made available for containing food by removing the pan and covering the cooler with a plate, and securing it in the same manner as the pan.

I do not wish to confine myself to any particular form or number of the water-supply troughs, the principal features of the invention consisting in bringing the open top of the trough in such close proximity to the bottom of the pan as to bring the water more intimately in contact therewith, and uniformly distribute it over the exterior bottom surface of the pan. Neither do I wish to be limited in the number of shelves, as this is dependent on the quantity of the milk to be cooled and the space the rack is to occupy.

Having thus fully described my invention, what I claim as new, and desire to secure by Letters Patent, is—

1. The combination, with the cooler A, having ledge $a$ and supported by rail $r$, and the pan B, having ledge $b$, of the bands $c$ and screws $s$, substantially as and for the purpose specified.

2. The combination, with a milk-pan, of an open water-trough, having its open top in close proximity to the bottom of the pan, to discharge the water through the opening between the top of the trough and bottom of the pan, substantially as described, and for the purpose set forth.

3. In combination with the cooler A and pan B, the water-supply trough $m$, supported at the end on the bottom of the cooler, and having at or near midway of its length the shoulder $n$ on top and connected with the supply-pipe $o$, constructed substantially as described and shown, for the purpose set forth.

4. The combination, with a rack having arranged therein one or more coolers, provided with the discharge-pipes $u$, $v$, and $w$, and the supply-pipes $o$ and $p$, and the reservoir R on top of the rack, of the reservoir T at or near the bottom of the rack, and pump 3, all constructed and arranged to operate substantially as specified and shown.

In testimony whereof I have signed my name and affixed my seal in the presence of two attesting witnesses at Syracuse, in the county of Onondaga and State of New York, this 9th day of December, 1875.

ALBERT F. BURGESS. [L. S.]

Witnesses:
 E. LAAS,
 CHRISTIAN HOLMSTRUP, Jr.